May 25, 1965     E. F. ROWEKAMP     3,185,288
TRANSFER FEED CONVEYOR
Filed June 14, 1963                                            6 Sheets-Sheet 1
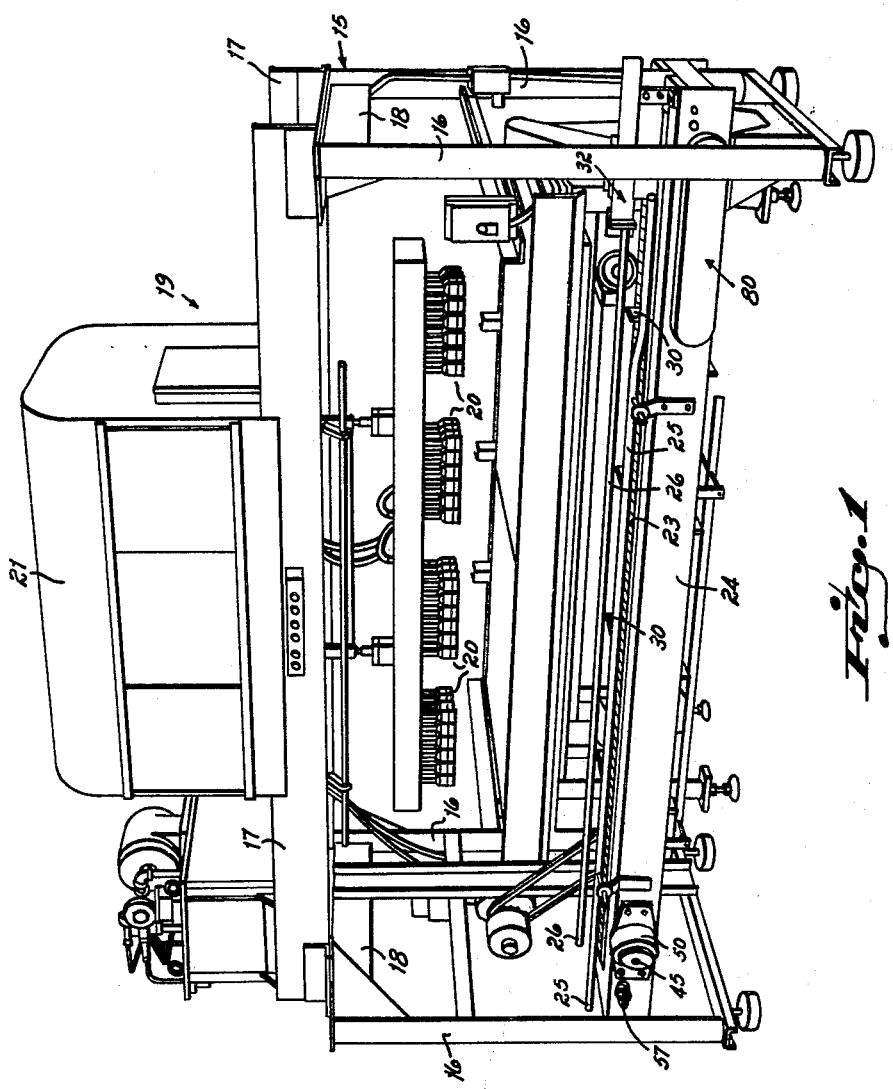
INVENTOR.
Edward F. Rowekamp
BY
Wood, Herron & Evans
ATTORNEYS

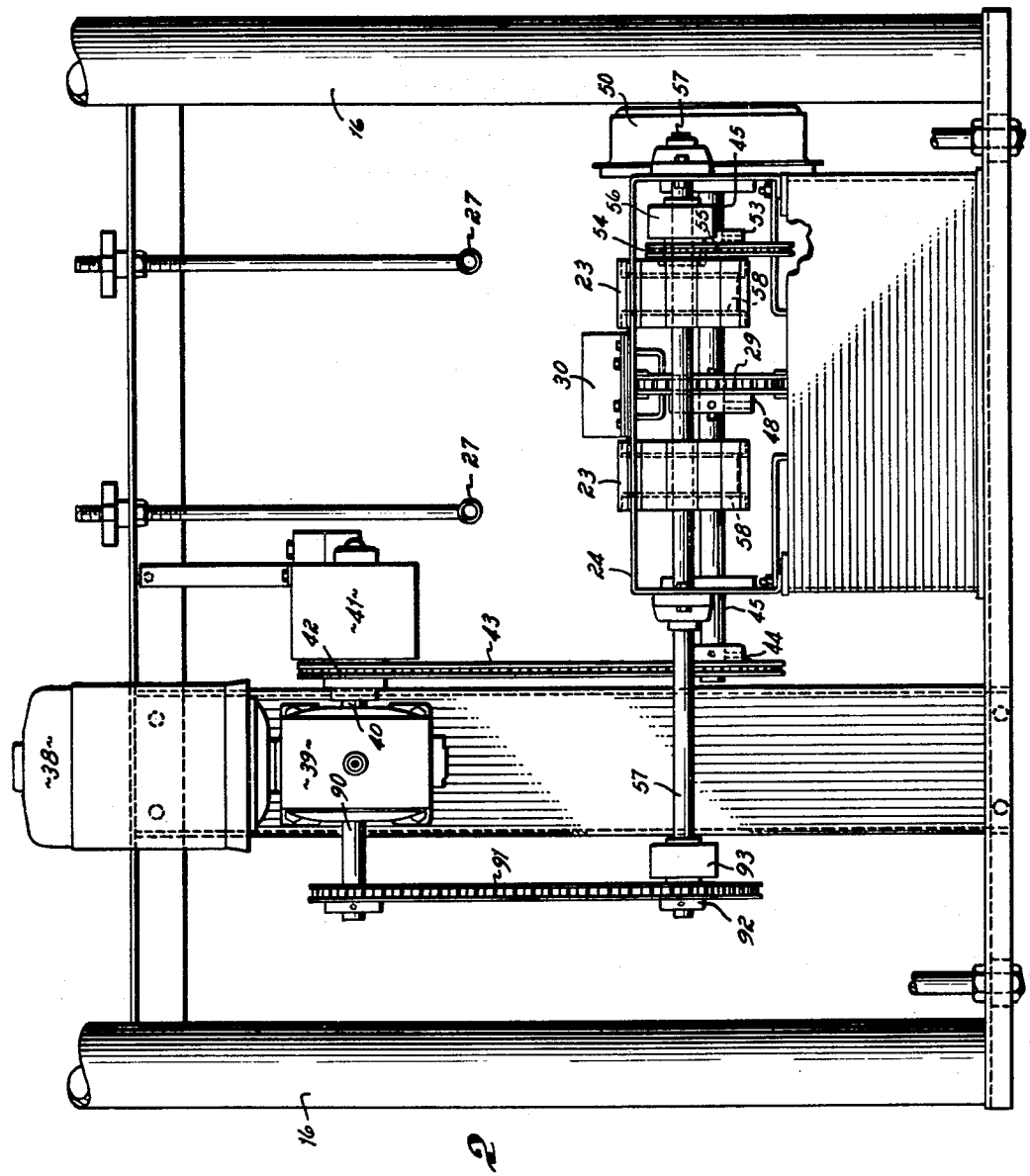

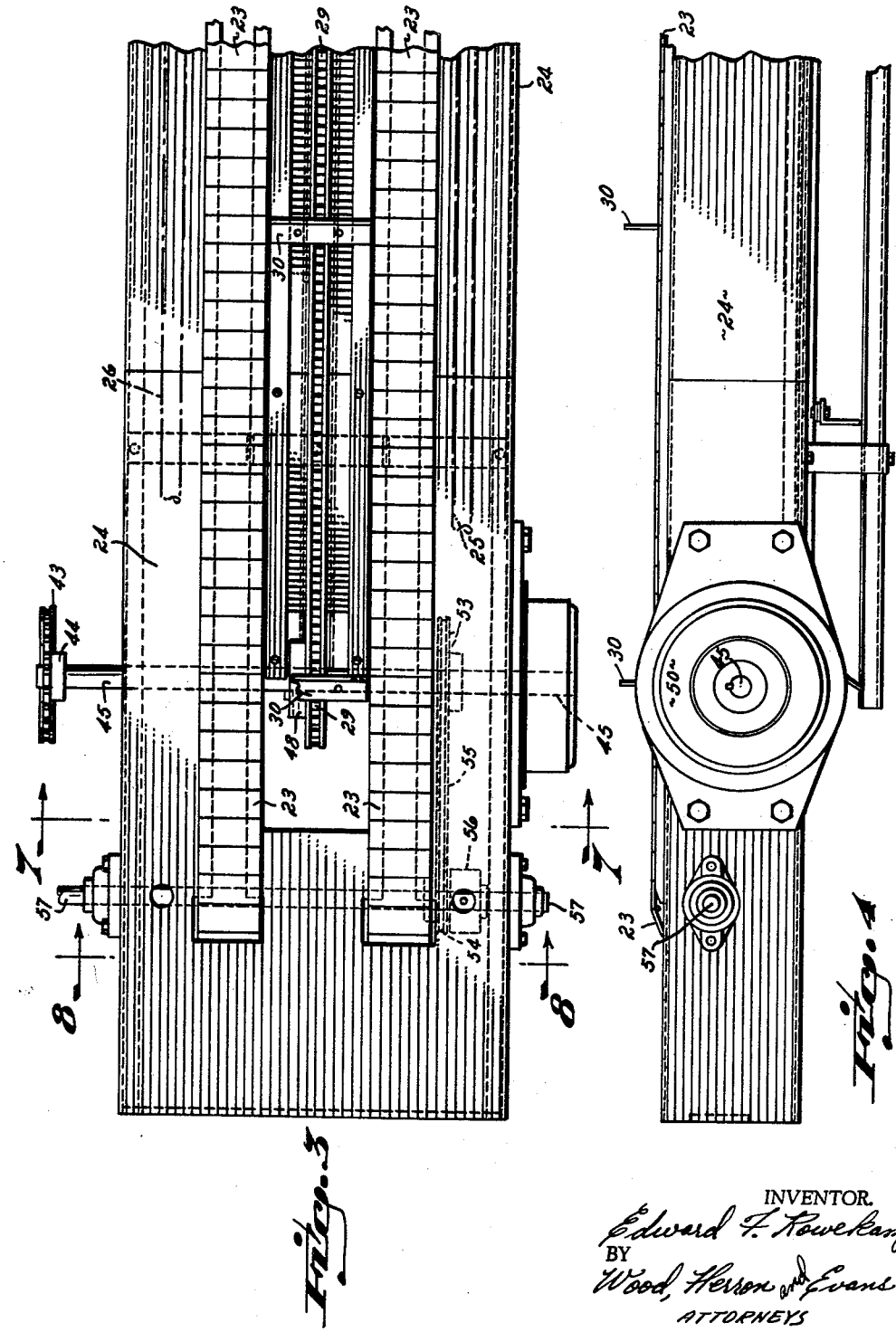

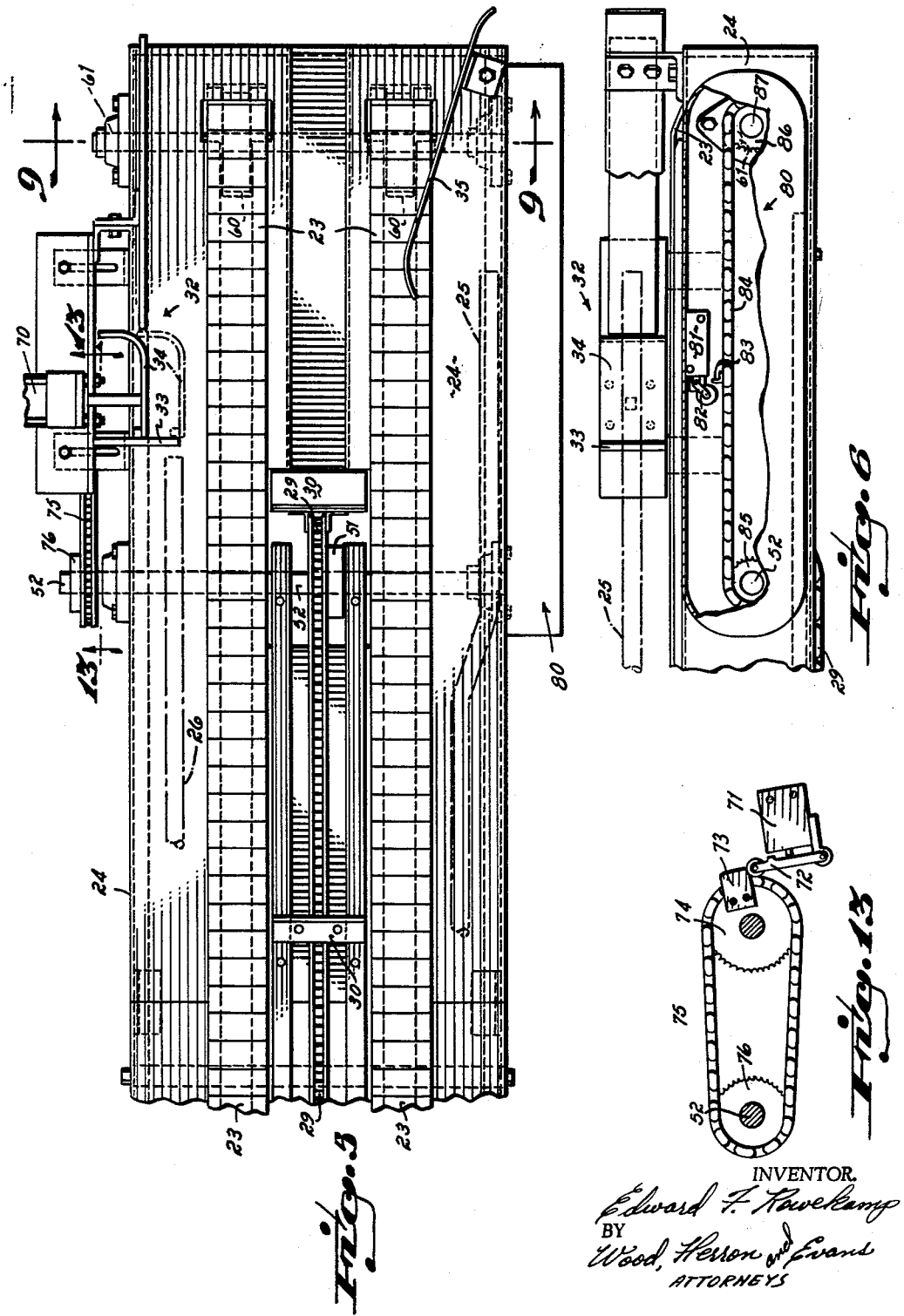

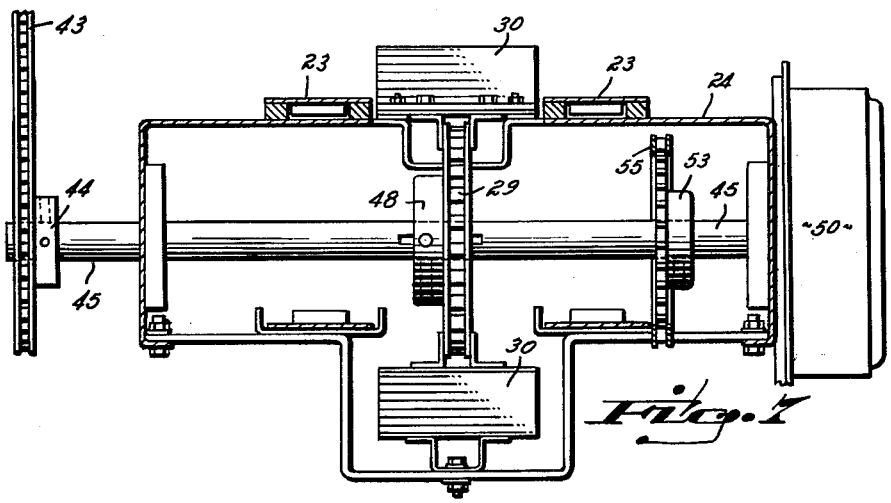
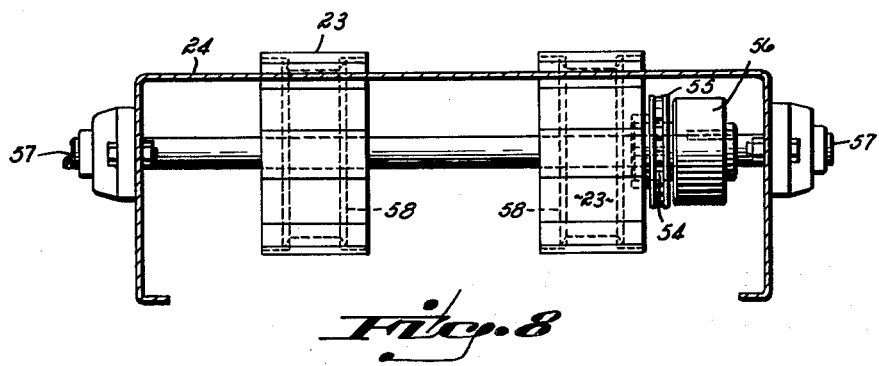
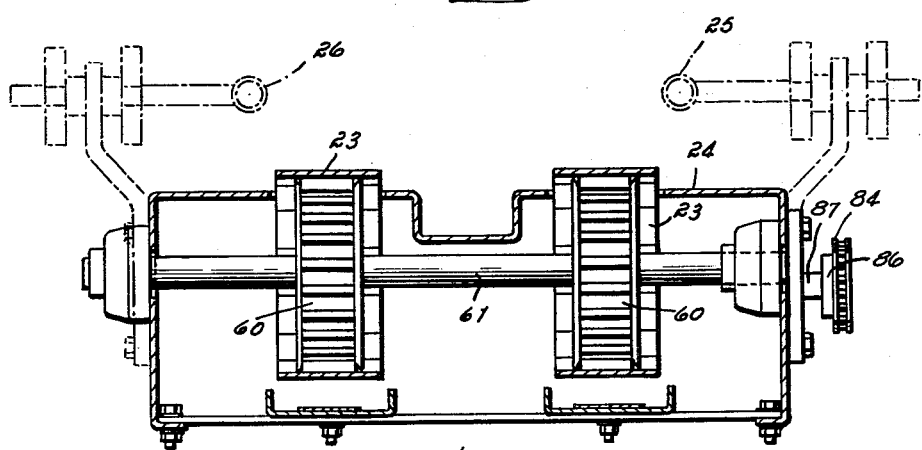

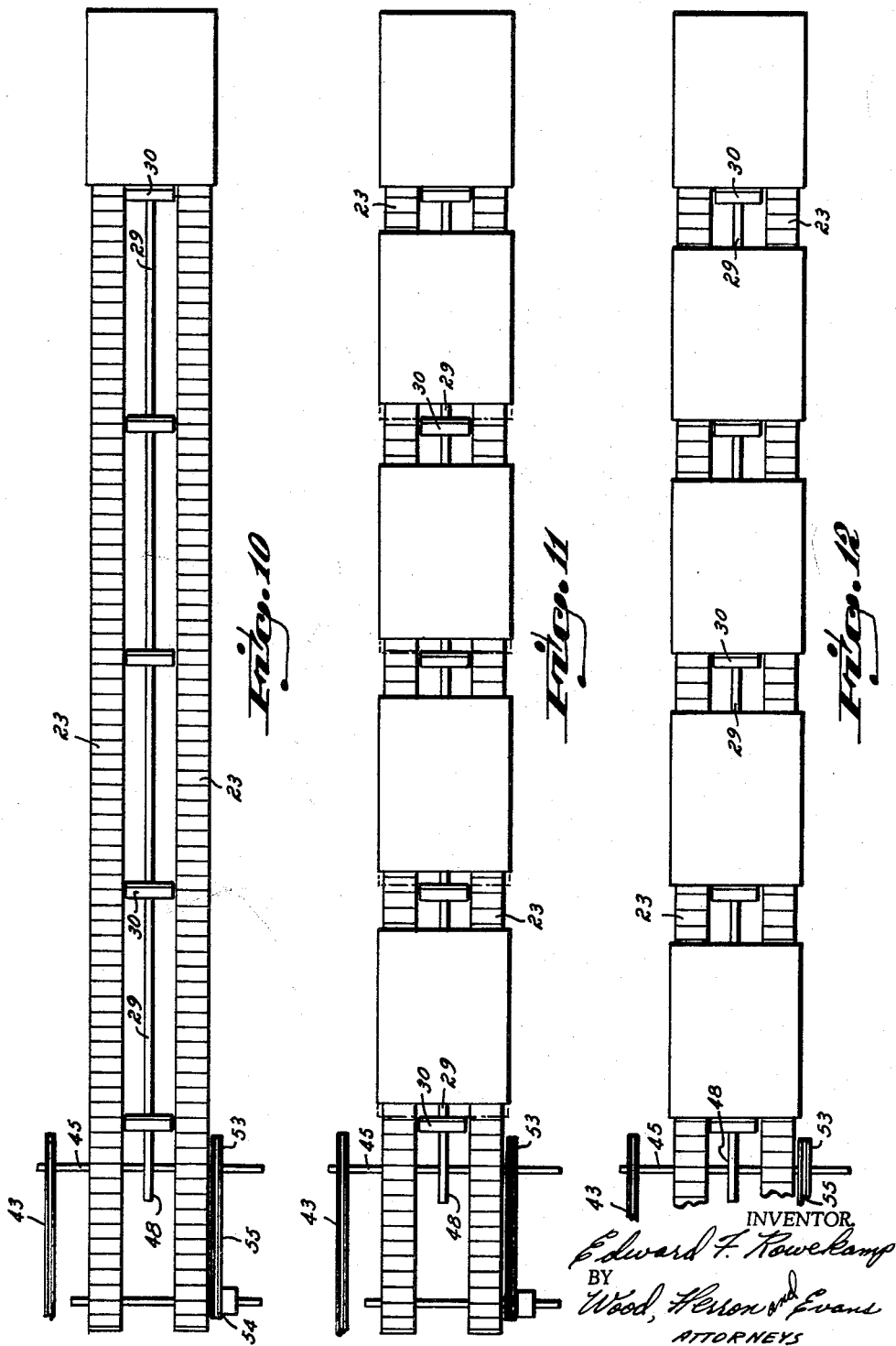

United States Patent Office 3,185,288
Patented May 25, 1965

3,185,288
TRANSFER FEED CONVEYOR
Edward F. Rowekamp, Cincinnati, Ohio, assignor to Lodge & Shipley Corporation, Cincinnati, Ohio, a corporation of Ohio
Filed June 14, 1963, Ser. No. 287,939
6 Claims. (Cl. 198—203)

This invention relates to conveyors and it is directed in particular to conveyors of the type adapted to be used in conjunction with article transferring apparatus designed to unload articles, such as bottles, out of cases.

The problem with which this invention is concerned is the ever increasing demand being placed upon article transferring apparatus for greater speeds of operation. Using a typical bottling plant as an example, bottles coming into the plant must be transferred to a filling machine, then to a capping machine, and possibly a labeling machine, and then to a machine that replaces the bottles in the cases. It is seldom, if ever, that the various machines making up the production line from one end of a bottling plant to the other all wear out at the same time. Thus, a bottling company that has had its production line in use for, say, ten years may find that it is necessary to replace the bottle washing machine. It finds that it can purchase machines designed to operate at a much higher rate of speed than the old machine. The capability of the higher operating speed of the bottle washing machine, therefore, outdates all of the other components of the production line. Under these circumstances, if the speeds of the other components making up the production line cannot be increased, the new machine cannot be operated up to its capabilities.

One of the more efficient case unloading machines presently on the market is one utilizing lifting cups of the type disclosed in Myerjohnan Patent No. 2,695,190 and McHugh Patent No. 2,873,996. The lifting cups of these patents are attached to a movable head constituting an air manifold. The lifting cups depend from the head in gangs or groups corresponding to the positions of bottles in cases. In operation, the head is lowered so that all of the bottles within the cases beneath it are engaged by the lifting cups and air pressure is applied to the cups, which causes the necks of the bottles to be gripped. The head then elevates, pulling all of the bottles from the cases, and moves to a position over a conveyor, or transfer table, where the bottles are released.

This case unloading machine is capable of unloading four cases at a time. With twenty-four bottles per case, a total of ninety-six are unloaded in each cycle of the machine. To meet the demands of an average bottling plant, the machine usually runs at about six cycles per minute, unloading a total of five hundred seventy-six bottles per minute, it meets the demands of the fastest production line now foreseen. Thus, increasing the cycles per minute for the case unloading machine has been no problem.

The problem arises in conveying the cases into the machine at the increased rates of operation. The cases are delivered to the machine by a conventional conveyor on which they are arranged end to end. In operating at ten cycles per minute, with each cycle taking six seconds, there is a period of only approximately three-plus seconds in which the cases can be moved into positions to be unloaded, because approximately two-plus seconds are required for the head to lower, grasp the bottles and lift them free of the cases. Cases to be unloaded, therefore, must be conveyed into positions beneath the cups and stopped in precise locations in a little over three seconds. The cases must travel approximately nine feet to arrive in these positions. It is found that if they are run up against stationary abutments or spacing abutments which stop suddenly, at the speed required by the limited time, they simply bounce back, and to different degrees, depending upon the materials and conditions of the cases. Thus, the heart of the problem lies in stopping the conveyor such that there is no bounce back or overtravel of the cases.

It may be seen therefore, that the primary objective of the invention has been to provide a conveyor that is adapted to move a number of cases rapidly and then halt them in precise locations. Another objective of the invention has been to provide a conveyor which will fulfill the primary objective, utilizing for the most part, tested conveyor elements that are both reliable and relatively inexpensive.

Other objectives and features of the invention will be readily apparent to those skilled in the art from the following description of the drawings, in which:

FIGURE 1 is a perspective view of a case unloading machine, capable of handling four cases at a time, in which a conveyor incorporating the principles of this invention is incorporated.

FIGURE 2 is an enlarged and elevational view, in which certain parts are broken away for clarity, as viewed from the discharge end of the machine, which is the left end as it appears in FIGURE 1.

FIGURE 3 is a fragmentary view looking down on the discharge end of the conveyor.

FIGURE 4 is a side elevational view of that portion of the conveyor shown in FIGURE 3.

FIGURE 5 is an enlarged fragmentary elevational view looking down on the infeed end of the conveyor.

FIGURE 6 is a side elevational view of that portion of the conveyor shown in FIGURE 5.

FIGURE 7 is a fragmentary cross sectional view taken on the line 7—7 in FIGURE 3.

FIGURE 8 is a fragmentary cross sectional view taken on the line 8—8 of FIGURE 3.

FIGURE 9 is a cross sectional view taken on the line 9—9 of FIGURE 5.

FIGURE 10 is a diagrammatic top plan view of the conveyor with only one case thereon at the infeed end.

FIGURE 11 is a view similar to FIGURE 10 showing the type of bounce back that is experienced when cases are run on a conveyor at the speeds required for the case unloading machine to operate at nine hundred sixty bottles per minute.

FIGURE 12 is a view similar to FIGURE 10 showing the positions of cases on the conveyor of this invention wherein no bounce back occurs.

FIGURE 13 is a cross sectional view taken along lines 13—13 of FIGURE 5.

General organization and operation

The general organization of the invention is illustrated in FIG. 1. The conveyor is mounted in a frame 15 which is constituted by four columns 16, a pair of longitudinal beams 17 and transverse beams 18. Supported on the frame is an unloading apparatus 19 which includes four sets of lifting cups 20, each set having twenty-four cups. It should be understood that the number of sets of cups as well as the number of cups in a set can be varied depending on the particular requirements of the user. The lifting cups are operated by a mechanism contained in housing 21. When four cartons are positioned below the respective sets 20, the cups are lowered onto the bottles, grip the bottles and lift them up and then transversely to that position at which they are released for further processing such as washing and sterilizing. The unloading apparatus is the subject of Patents Nos. 2,695,190 and 2,873,996 and does not need to be described in detail here.

The cases which are emptied by the unloading apparatus travel into position on a pair of endless conveyor tracks 23 mounted on a shroud 24. The cases are guided in a transverse direction by spaced guide rails 25 and 26. The flaps of the cases are held open by rails 27 (FIG. 2).

Located between the conveyor tracks 23 is a stop chain 29 which carries a series of stop angles 30 which project above the conveyor tracks 23 and are engageable by the incoming cases. Each stop angle 30 is rigidly fixed to a link of chain 29, the stop angles being spaced apart a distance equal to the distance between the sets of lifting cups. The stop chain 29 is driven by a motor, and the conveyor tracks are driven from the stop chain, all as described more fully below. Preferably the conveyor tracks are driven at a much higher lineal speed than the stop chain. For example, the conveyor tracks may be driven at about two hundred feet per minute and the stop chain driven at one hundred feet per minute.

At the infeed or loading end of the conveyor an indexing mechanism 32 is provided. The indexing mechanism, as best illustrated in FIG. 5, includes a stop plate 33 and a pusher bar 34. The stop plate is engaged by cases which are pushed into it by a conveyor (not shown) adjacent to the infeed end of the present conveyor. The cartons are guided into engagement with the stop plate by a resilient case guide 35. At preselected time intervals, the pusher bar 34 moves transversely to slide a case beyond the stop plate 33 so that it can be transported by the conveyor tracks 23 into position below the unloading apparatus. The instant at which the cases are slid beyond the stop plate 33 is that in which a stop angle 30 has just moved into a vertical position on the stop chain 29. This timed relationship provides a series of spaced cases being moved longitudinally by the conveyor tracks, the adjacent spaced cases having stop angles 30 between them. Because of the greater speed of the conveyor tracks 23, than the stop chain 29, each case rapidly moves into engagement with the stop angle immediately ahead of it and is held in engagement with that stop angle until the stop angle reaches the proper position under the unloading apparatus.

As soon as four loaded cases are moved into proper position under the unloading apparatus, a limit switch is operated to apply an air brake to the stop chain 29. The stop chain is braked at a fixed position, that position being such that when the lifting cups move into the cases abutting the stop angles, the lifting cups will be aligned with respect to the bottles within the case.

Since the conveyor tracks 23 are driven by the stop chain, when the stop chain is braked, in the absence of the present invention the conveyor track also would be braked. If the conveyor track stops at the same instant that the stop chain stops the cases lodged against the stop angles 30 will tend to bounce back, that condition being illustrated in FIG. 11. The amount of bounce-back is an indeterminable quantity which depends upon several factors particularly including the condition of the surface of the case which engages the conveyor tracks and the like. The objective of the present invention is to compensate for the bounce-back and to provide assurance that the cases will be aligned with respect to the lifting cups as are the stop angles 30.

To this end, there is provided between the drive of the stop chain 29 and the conveyor tracks 23 an overrunning clutch which permits the conveyor tracks to coast forward after the stop chain has been braked, the coasting forward of the conveyor tracks bringing the cases back into abutting engagement with the stops 30.

In some instances there may not be sufficient inertia of the conveyor tracks to overrun that distance needed to return the cases into abutment with the stops 30. For such situations, there is provided an additional drive to the conveyor tracks 23 connected by means of an overrunning clutch. That additional drive will be ineffective when the conveyor system is bringing cases into proper position, but, upon stopping of the stop chain 29, the additional drive will continue to move the conveyor tracks at a slow rate of speed, as for example 50 feet per minute thereby providing positive assurance that the cases will be brought into abutment with the stops 30. The slow rate of speed eliminates the possibility of abrading or wearing of the bottoms of the cases while they are held stationary while being unloaded.

Conveyor drive system

The conveyor drive is powered by an alternating current motor 38 which is connected through a speed reducing gear box 39 to a shaft 40. The shaft 40 is connected to the driving portion of an air clutch 41, the driven portion being connected to a sprocket 42. The sprocket 42 is connected by a chain 43 to a sprocket 44 fixed on a shaft 45 which constitutes the main drive shaft for the system. The shaft 45 carries a sprocket 48 which drives the stop chain 29. An air brake 50 is mounted on the end of shaft 45 and is bolted to the shroud 24. The infeed end of stop chain 29 passes over a sprocket 51 which is fixed to shaft 52.

The drive shaft 45 carries a second sprocket 53 which is connected to a sprocket 54 by a chain 55 to drive the conveyor tracks 23. The sprocket 54 is connected by an overrunning clutch 56 to a drive shaft 57 for the conveyor tracks 23, the conveyor tracks being mounted on sprockets 58 fixed to the shaft 57 at the discharge end of the conveyor. At the infeed end of the conveyor the conveyor tracks are mounted on sprockets 60 which are fixed to a shaft 61.

The overrunning clutch in the preferred embodiment is of known design and contains two sets of concentrically disposed load carrying sprags, the sprags being oriented to permit rotation of one member with respect to the other in one direction but requiring the members to move together in the opposite direction.

The elements of the drive system are designed so as to provide a lineal speed of the stop chain of about one hundred feet per minute and a lineal speed of the conveyor tracks of about two hundred feet per minute.

Case indexing mechanism

The case indexing mechanism includes the stop plate 33 and pusher bar 34 which are mounted at the infeed end of the conveyor. The pusher bar 34 is operated by a spring return air cylinder 70. The air cylinder is operated by an air valve 71 mounted on the shroud 24. The air valve 71 has an operator lever 72 which, when depressed, opens the valve to admit air to the cylinder thereby operating the pusher arm 34. The lever 72 is engageable by a cam 73 fixed to a sprocket 74 rotatably mounted on the shroud 24. The sprocket 74 is driven by a timing chain 75 which passes over a sprocket 76 fixed to the shaft 52 which carries the stop chain 29. Because of the fixed or non-slip relationship between the stop chain and the timing chain 75, the pusher arm will always operate at precisely the proper instant in relation to the movement of the stop angles 30 to insure the thrusting of a case beyond the stop plate 33 between two stop angles 30. The greater lineal speed of the conveyor tracks then brings the case rapidly into engagement with the leading stop.

Indexing mechanism for positioning cases

The cases carried by the conveyor tracks must be precisely positioned under the unloading apparatus 19 to permit the lifting cups 20 to engage their respective bottles properly. A deviation of no more than approximately one-fourth inch can be tolerated between centers of the bottles and lifting cups respectively. That which determines the position of each case is its leading stop angle 30 carried by chain 29. The chain 29 is stopped by the simultaneous application of brake 50 and release of clutch 41.

The circuitry controlling the brake and clutch is energized by the indexing mechanism indicated at 80. That mechanism includes a limit switch 81 which, when tripped, applies brake 50 and releases clutch 41. The limit switch has an arm 82 which is engageable by a trip angle 83 fixed to a timing chain 84. The timing chain passes over a sprocket 85 which is fixed to the shaft 52 driven by the stop chain 29. The timing chain 84 is supported also by a sprocket 86 mounted on a shaft 87 which is carried by the shroud 24.

Because of the non-slip drive between the stop chain 29 and the timing chain 84, the stop chain 29 will be stopped by the brake 50 at precisely that instant which will cause the cases to be disposed immediately under the case transferring apparatus with their bottles in proper alignment with the lifting cups. After the bottles are removed from the cases, the brake is released and the clutch applied by the circuitry associated with unloading apparatus.

Additional drive system for conveyor tracks

To provide added assurance that the conveyor tracks will move the cases into engagement with the stop angles 30 when they have bounced away from the stop angles upon braking of the chain 29, a slow drive system for the conveyor tracks 23 is provided. The drive system is purposely maintained as a slow drive system in order to prevent the excessive wear on the bottoms of the cases which would be occasioned if the conveyor tracks were to continue to be driven at two hundred feet per minute.

The additional drive is constituted by a drive shaft 90 projecting from the gear box 39, the drive shaft 90 being connected through a roller chain 91 passing over a large speed reducing sprocket 92 to an overrunning clutch 93. The overrunning clutch is mounted upon the shaft 57. The overrunning clutch is oriented to permit the shaft 57 to be driven at a high speed during the transfer of the cases. However, when the stop chain is braked, the drive from the gear reducer 91 takes over, through the overrunning clutch 93 to drive the conveyor tracks at approximately fifty feet per minute. The continued driving of the conveyor tracks provides assurance that the cases will be brought into abutment with the stop angles 30 when they have bounced away from the stop angles 30 upon braking of the stop chain 29.

Operation

In the operation of the invention the cases containing a predetermined number of bottles are conveyed to the loading or infeed end of the conveyor of the present invention preparatory to being unloaded by the bottle lifting apparatus. The cartons are in abutting end-to-end relation and are held against movement into the apparatus by the stop plate 33. The cases are permitted to pass into the apparatus by the pusher arm 34 which is operated by the case indexing mechanism. Each time the cam 73 passes the follower 72 on the air valve 71, the air valve opens to admit air to the air cylinder 70 and causes the movement of the pusher arm to the position indicated in broken lines in FIG. 4, thereby pushing a case beyond the stop plate 33. The spring return on the air cylinder immediately drops the arm back to the position shown in full lines in FIG. 5. The next incoming case is forced over to the stop plate 33 by the resilient guide arm 35.

The conveyor tracks 23, moving at about two hundred lineal feet per minute, rapidly bring each case as it passes the stop plate 33 into engagement with a respective stop angle 30 on the stop chain 29 which is traveling at only about one hundred feet per minute.

When four cases are carried to positions immediately below the unloading apparatus and in proper alignment with the lifting cups the limit switch 81 is tripped by the angle 83, causing the operation of the clutch 41 and brake 50 on the stop chain. The brake 50 causes the stop angles to stop at precisely that position which will permit cases abutting the stop angles to be unloaded by the bottle lifting mechanism. The limit switch 81 simultaneously initiates the operation of the lifting mechanism.

When cases traveling at one hundred feet per minute are instantaneously stopped, they will tend to bounce back away from the stop angles 30. The conveyor tracks 23 which are connected to the stop chain drive 29 through overrunning clutch 56 will continue to move thereby carrying the cases back into abutting engagement with the stop angles 30.

In the event that the additional drive for the conveyor tracks is employed, a similar although more positive result is attained through the continued drive of the shaft 57 connected to the conveyor tracks through overrunning clutch 93. In either event, the continued movement of the conveyor tracks after the stop chain has been braked will provide assurance that the cases are precisely positioned in abutting engagement with the stops 30 so that the cases can be unloaded by the bottle lifting mechanism.

After the group of four cases has been unloaded, the clutch 41 is applied and brake 50 released and a new cycle of operations begins.

I claim:
1. Conveyor apparatus for cases of articles comprising,
   an endless conveyor track for supporting and conveying said cases,
   an endless stop chain mounted parallel to said conveyor track, and having a plurality of spaced stops engageable by said cases,
   a motor drivably connected to said stop chain,
   means including an overrunning clutch operatively connecting said stop chain to said conveyor track to drive said conveyor track at a lineal speed greater than the lineal speed of said stop chain, and permitting over travel of said conveyor track after said stop chain is braked,
   and brake means for stopping said stop chain.
2. Conveyor apparatus for cases of articles comprising,
   an endless conveyor track for supporting and conveying said cases,
   an endless stop chain mounted parallel to said conveyor track,
   a motor drivably connected to said stop chain,
   means including an overrunning clutch operatively connecting said stop chain to said conveyor track to drive said conveyor track, and permitting over travel of said conveyor track after said stop chain is braked,
   and brake means for stopping said stop chain.
3. Conveyor apparatus for cases of articles comprising,
   an endless conveyor track for supporting and conveying said cases,
   an endless stop chain mounted parallel to said conveyor track,
   a motor drivably connected through an electrically operated clutch to said stop chain,
   means including an overrunning clutch operatively connecting said stop chain to said conveyor track and permitting over travel of said conveyor track after said stop chain is braked to drive said conveyor track,
   an electrically operated brake on said stop chain for stopping said stop chain,
   and electrical switch means for causing the simultaneous disengagement of said clutch and operation of said brake at a preselected position of said stop chain.
4. Conveyor apparatus for cases of articles comprising,
   an endless conveyor track for supporting and conveying said cases,
   an endless stop chain mounted parallel to said conveyor track,
   a clutch, a motor drivably connected through said clutch to said stop chain,
   brake means for stopping said stop chain,
   means including an overrunning clutch operatively connecting said stop chain to said conveyor track to drive said conveyor track normally at a lineal speed greater than the lineal speed of said stop chain, and permitting over travel of said conveyor track after said stop chain is braked, drive means connecting said motor directly to said conveyor track through an overrunning clutch to drive said conveyor track at a speed substantially less than the normal speed of said conveyor track,
and means for simultaneously disengaging said clutch and operating said brake at a preselected position of said stop chain.

5. Conveyor apparatus for cases of articles comprising,
an endless conveyor track for supporting and conveying said cases,
an endless stop chain mounted parallel to said conveyor track and having a plurality of spaced stops engageable by said cases,
means for stopping said stop chain,
a motor drivably connected to said stop chain,
means including an overrunning clutch operatively connecting said stop chain to said conveyor track to drive said conveyor track at a lineal speed greater than the lineal speed of said stop chain, and permitting over travel of said conveyor track after said stop chain is braked,
and case indexing means for introducing cases, one at a time, onto said conveyor track and positioned between adjacent stops.

6. Conveyor apparatus comprising,
an endless conveyor track for conveying articles,
an endless stop chain mounted parallel to said conveyor track, and including stops engageable by said articles,
brake means for stopping said chain,
means driving said track and chain in the same direction,
said driving means including means providing at least sufficient continued movement of said conveyor track following braking of said stop chain to dispose said articles in abutting relation to said stops.

References Cited by the Examiner

UNITED STATES PATENTS

| | | | |
|---|---|---|---|
| 2,772,768 | 12/56 | Hogan | 198—203 |
| 2,929,484 | 3/60 | Longdon | 198—19 |
| 3,080,968 | 3/63 | Liberty | 198—76 |
| 3,092,237 | 6/63 | Miller | 198—19 |

SAMUEL F. COLEMAN, *Primary Examiner.*

ERNEST A. FALLER, JR., *Examiner.*